United States Patent
Blake (10) Patent No.: US 9,842,032 B2
(45) Date of Patent: Dec. 12, 2017

(54) MEMORY FIRST LIVE SNAPSHOT

(71) Applicant: Red Hat, Inc., Raleigh, NC (US)

(72) Inventor: Eric Blake, Salt Lake City, UT (US)

(73) Assignee: Red Hat, Inc., Raleigh, NC (US)

( * ) Notice: Subject to any disclaimer, the term of this patent is extended or adjusted under 35 U.S.C. 154(b) by 142 days.

(21) Appl. No.: 14/011,572

(22) Filed: Aug. 27, 2013

(65) Prior Publication Data

US 2015/0066859 A1 Mar. 5, 2015

(51) Int. Cl.
*G06F 11/14* (2006.01)
(52) U.S. Cl.
CPC ...... *G06F 11/1484* (2013.01); *G06F 11/1438* (2013.01); *G06F 2201/84* (2013.01)
(58) Field of Classification Search
CPC ............. G06F 11/1451; G06F 11/1438; G06F 2201/84; G06F 11/1484
See application file for complete search history.

(56) References Cited

U.S. PATENT DOCUMENTS

| 7,484,208 | B1* | 1/2009 | Nelson ................ G06F 9/45558 711/6 |
| 7,529,897 | B1* | 5/2009 | Waldspurger ....... G06F 11/1438 711/161 |
| 8,365,167 | B2 | 1/2013 | Beaty et al. |
| 8,533,410 | B1* | 9/2013 | Corbett ................... G06F 12/00 707/637 |
| 2010/0049929 | A1 | 2/2010 | Nagarkar et al. |
| 2010/0049930 | A1 | 2/2010 | Pershin et al. |
| 2010/0058106 | A1 | 3/2010 | Srinivasan et al. |
| 2010/0107158 | A1 | 4/2010 | Chen et al. |
| 2010/0174943 | A1 | 7/2010 | Liu et al. |

(Continued)

FOREIGN PATENT DOCUMENTS

WO WO2012149844 11/2012

OTHER PUBLICATIONS

Li, Jianxin, "iROW: An Efficient Live Snapshot System for Virtual Machine Disk", State Key Lab. of Software Dev. Environ., Beihang Univ., retrieved from http://ieeexplore.ieee.org/xpl/login.jsp?tp=&arnumber=6413673&url=http%3A%2F%2Fieeexplore.ieee.org%2Fxpls%2Fabs_all.jsp%3Farnumber%3D6413673, Dec. 17-19, 2012, 2 pages, Beijing, China.

(Continued)

*Primary Examiner* — David X Yi
*Assistant Examiner* — Zubair Ahmed
(74) *Attorney, Agent, or Firm* — Lowenstein Sandler LLP (57) ABSTRACT

The subject matter of this specification can be implemented in, among other things, a method including receiving a request to create a live snapshot of a state of a virtual machine including a memory and an original disk file. The method further includes copying, by a hypervisor, data from the memory to a storage device to form a memory snapshot. The method further includes pausing the virtual machine and creating a new disk file at a reference point-in-time. The original disk file is a backing file of the new disk file. The method further includes resuming the virtual machine. The virtual machine is to perform disk operations using the new disk file after the reference point-in-time. The method further includes copying the original disk file to a disk snapshot file. The method further includes providing the live snapshot including the disk snapshot file and the memory snapshot.

19 Claims, 5 Drawing Sheets

(56) References Cited

U.S. PATENT DOCUMENTS

| | | | |
|---|---|---|---|
| 2010/0228913 A1* | 9/2010 | Czezatke | G06F 11/1451 711/112 |
| 2011/0066786 A1* | 3/2011 | Colbert | G06F 9/45558 711/6 |
| 2011/0197039 A1* | 8/2011 | Green | G06F 3/0617 711/162 |
| 2011/0252208 A1 | 10/2011 | Ali et al. | |
| 2012/0233611 A1* | 9/2012 | Voccio | G06F 9/45558 718/1 |
| 2012/0246424 A1* | 9/2012 | Yuhara | G06F 11/1456 711/162 |

OTHER PUBLICATIONS

Chamarthy, Kashyap, "Snapshotting with Libvirt for qcow2 Images", retrieved from http://kashyapc.wordpress.com/2011/10/04/snapshotting-with-libvirt-for-qcow2-images/, Oct. 4, 2011, 7 pages.

* cited by examiner

MEMORY FIRST LIVE SNAPSHOT

TECHNICAL FIELD

Implementations of the present disclosure relate to a computing system, and more specifically, to memory first live snapshotting for a virtual machine.

BACKGROUND

Virtualization entails running programs, usually multiple operating systems, concurrently and in isolation from other programs on a single system. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. A hypervisor may save a state of a virtual machine at a reference point in time, which is often referred to as a snapshot. The snapshot can be used to restore or rollback the virtual machine to the state that was saved at the reference point in time.

DESCRIPTION OF DRAWINGS

The details of one or more implementations are set forth in the accompanying drawings and the description below. Other features and advantages will be apparent from the description and drawings, and from the claims.

DETAILED DESCRIPTION

The present disclosure pertains to creating a live snapshot of a virtual machine (VM). A host computer system ("host") provides computing resources (e.g., processing power, memory, storage, input output (I/O) interfaces, devices, etc.) to a VM. The host computer system can use a hypervisor to control the VM's use of the computing resources. The hypervisor can create a point-in-time copy of the state of the VM, which is referred to as a snapshot. Snapshots that are created while the VM is executing are referred to as live snapshots. Snapshots can preserve the state of a VM by creating a record of the VM's operating system (e.g., guest operating system), disks, memory, and applications at a given point in time. Snapshots can be taken at various points in time.

As a VM performs operations, it can make changes to data (e.g., memory, stored data, code) associated with the VM. For example, changes to the data can come in the form of software updates that can be applied to the VM and to applications that are executed by the VM. Sometimes, changes to the data can affect execution of the VM (e.g., cause data corruption, cause the VM to terminate abnormally). The hypervisor can perform a rollback to restore the VM to a previous state captured in the snapshot as if the changes to the data had never happened.

To create a snapshot, contemporary techniques include stopping execution of the VM to prevent any input/output operations that might change data of the VM when creating the snapshot. Then, a snapshot of the VM is taken, after which the VM is resumed. The larger the VM and associated data, storage and memory, the longer it will take to complete the snapshot, which also means longer downtime for the VM until the snapshot is complete. Stopping the VM for long periods of time, which can be a matter of seconds or less, negatively impacts those who try to use the suspended VM. VM downtime is especially problematic for high volume VMs where uptime is critical. When a VM has multiple disks, downtime can be even longer because contemporary systems typically take each disk offline and perform a backup of each disk before resuming the VM. In addition, when the VM has multiple disks, backing up all of the disks can be difficult to manage when using contemporary techniques. When the backup of all of the disks is complete, the VM is resumed. Some contemporary techniques have attempted to backup storage data while the VM is running. However, the VM continues to modify the disk as it is being backed up. This can create mismatches between the data in the backup and the data in the disk. Data mismatches can corrupt the snapshot and render it unusable.

Aspects of the present disclosure address these shortcomings by reducing the time to take a consistent and reliable snapshot with minimal downtime or interruption of the VM. The hypervisor copies memory allocated to the VM to a storage device to create a memory snapshot. The hypervisor can copy the memory to the storage device in portions. When a small portion of memory remains to be copied to the storage device, then, the hypervisor can pause the VM, and copy the remaining portion of memory to the storage device. The hypervisor can also create a new disk file associated with a reference point in time. Once the new disk file is created, the hypervisor can immediately resume the VM, which means the only downtime the VM may have is the amount of time it takes to create the new disk file and copy a small portion of memory to the storage device. Subsequent write disk operations can be handled using the new disk file. The state of the data of the original disk file at the reference point in time is preserved (e.g., by preventing new data from being written to the original disk file). When accessing data not in the new disk file, the VM accesses the data from the original disk file. In other words, the original disk file is a backing file of the new disk file.

The hypervisor can also copy data from the original disk file to another file, such as a disk snapshot file. Because the state of the data of the original disk file at the reference point in time is preserved, the hypervisor can take as long as it needs to synchronize the original disk file and the disk snapshot file without stopping the VM and without risking data mismatch. When the original disk file and the disk snapshot file are synchronized, the snapshot is complete. The snapshot includes the memory that was copied to the storage device as the memory snapshot and the disk snapshot file, both of which represent the state of the VM at the reference point in time. Further, when the VM has multiple disks, the hypervisor can manage the snapshot creation using a single management file (e.g., by tracking the copy progress of each disk and recording the tracked information in the single management file). When the hypervisor pauses the VM, it creates a new disk file for each disk at the reference point in time. For a VM with multiple disks, VM downtime is still minimal as it is only down while creating a new disk file for each disk. In this manner, the hypervisor can create a consistent, live snapshot of the VM that includes one or more disks with minimal downtime or interruption to the VM.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

For brevity, simplicity and by way of example, a hypervisor performs many of the operations described herein. It is contemplated that other actors may perform some or all of the operations described herein, including a host operating system, multiple hypervisors, a snapshot manager, and the like, including a combination thereof.

Figure 1:
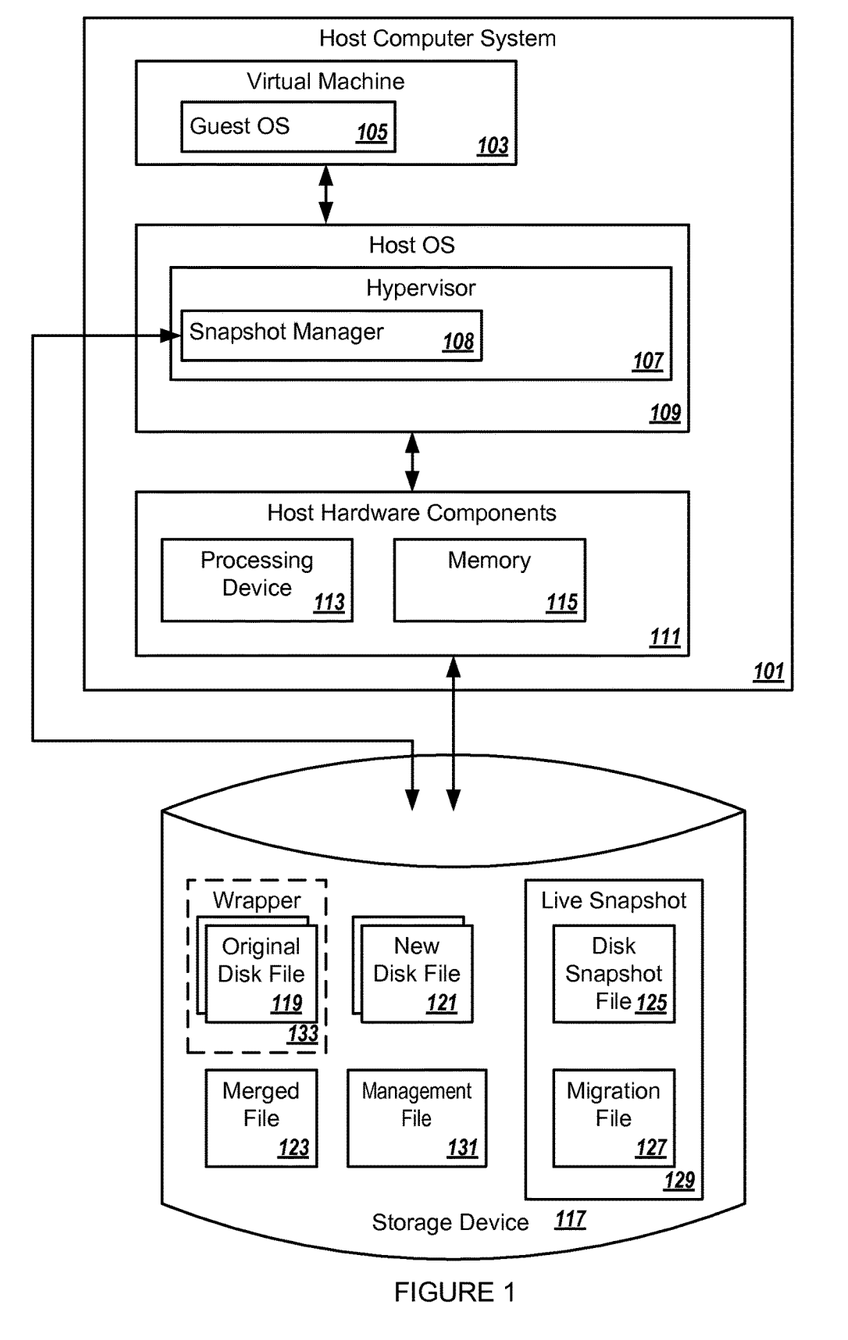
FIG. 1 is a block diagram of a host computer system in accordance with some implementations.

FIG. 1 is a block diagram that illustrates an example of a host computer system 101 that hosts one or more VMs 103. Each VM 103 runs a guest operating system (OS) 105. The VMs 103 may have the same or different guest operating systems 105, such as Microsoft Windows®, Linux®, Solaris®, Mac®OS, etc. The host computer system 101 may be a server, a workstation, a personal computer (PC), a mobile phone, a palm-sized computing device, a personal digital assistant (PDA), etc.

The host computer system 101 runs a hypervisor 107 to virtualize access to the underlying host hardware, making the use of the VM 103 transparent to the guest OS 105 and a user of the host computer system 101. The hypervisor 107 may also be known as a virtual machine monitor (VMM) or a kernel-based hypervisor. The hypervisor 107 may be part of a host OS 109 (as shown in FIG. 1), run on top of the host OS 109, or run directly on the host hardware without an operating system beneath it (i.e., bare metal). The host OS 109 can be the same OS as the guest OS 105, or can be a different OS. The hypervisor 107 can include a snapshot manager 108 that handles snapshot creation.

The host computer system 101 includes hardware components 111 such as one or more physical processing devices (e.g., central processing units (CPUs)) 113, memory 115 (also referred to as "host memory" or "physical memory") and other hardware components. In one implementation, the host computer system 101 includes one or more physical devices (not shown), which can be audio/video devices (e.g., video cards, sounds cards), network interface devices, printers, graphics modules, graphics devices, system components (e.g., PCI devices, bridges, ports, buses), etc. It is understood that the host computer system 101 may include any number of devices.

The host computer system 101 may also be coupled to one or more storage devices 117 via a direct connection or a network. The storage device 117 may be an internal storage device or an external storage device. Examples of storage devices include hard disk drives, optical drives, tape drives, solid state drives, and so forth. Storage devices may be accessible over a local area network (LAN), a wide area network (WAN) and/or a public network such as the internet. Examples of network storage devices include network attached storage (NAS), storage area networks (SAN), cloud storage (e.g., storage as a service (SaaS)), and so forth.

The storage device 117 may store one or more files, such as a set of original disk files 119, a set of new disk files 121, a set of merged files 123, a set of disk snapshot files 125 and a set of migration files 127, each described herein. As the term is used herein, a set of files refers to one or more files. The storage device 117 may also store one or more live snapshots 129 and a management file 131, each described herein. The files stored by storage device 117 can be any file type and in any format. In some implementations, some of the files can be disk images that represent data on a hard disk. A disk image can be in any format, such as a portable binary image (e.g., raw), copy-on-write (e.g., cow), compressed loop (e.g., cloop), Quick EMUlator (QEMU) copy-on-write format (e.g., qcow, qcow2), and others, such as vmdk, vdi, etc. In an example, original disk file 119, new disk file 121, merged file 123, and disk snapshot file 125 are disk image files, the migration file 127 is a file that contains a copy of the memory of a VM, and the management file 131 is any type of file in a machine-readable format (e.g., XML). When the host computer system 101 is attached to multiple storage devices 117, some files may be stored on one storage device, while other files may be stored on another storage device.

Each disk file 119, 121, 123, 125 may be a single file, set of files or sequence of data (e.g., a contiguous or non-contiguous set of blocks in a block device) that contains the contents and structure representing a storage device such as a hard drive. Each disk file 119, 121, 123, 125 may contain the information that defines a particular VM 103, as described above. The original disk file 119 may be used to execute VM 103. For example, when instantiating a VM, a system administrator can use the original disk file 119 to load a desired guest operating system along with system drivers, guest applications, user data, etc. When a VM 103 is to be loaded, a virtual disk image manager (not shown) may provide hypervisor 107 with a path to an original disk file 119 that contains the VM. Hypervisor 107 may load the VM 103 from the original disk file 119, and the loaded VM 103 may be connected to that original disk file 119 (e.g., to a particular area of storage on storage device 117 that includes the original disk file 119). The original disk file 119 may appear to the VM as a physical storage device. Once a VM 103 is loaded and connected to its original disk file 119, I/O operations (e.g., read and write operations) that it performs may cause data to be read from and/or written to the original disk file 119. Multiple original disk files 119 can be connected to and used by the VM 103. When there are multiple original disk files 119, one of the original disk files 119 can contain the information that defines a particular VM 103 while the other original disk files 119 can serve as disks or hard drives for the VM 103.

While the VM is running, the snapshot manager 108 in the hypervisor 107 can receive a request to create a live snapshot 129 of a state of the VM 103. The snapshot manager 108 can receive the request from any source, including from a system administrator, an automated snapshot event scheduler, and the like. Upon receiving the request, the snapshot manager 108 copies the state of the memory 115 to the storage device 117 (e.g., original disk file 119). To copy the state of the memory 115, the snapshot manager 108 can divide the memory 115 into clusters, segments or sectors, etc. and can copy the memory to the storage device 117 in a piece-wise manner. The clusters, segments or sectors of memory can be an arbitrary division of memory and can include one or more memory page files. While the memory is being copied, the VM 103 is still running. The snapshot manager 108 can invoke copy on write semantics to the memory such that before the running VM 103 modifies (e.g., writes to) the memory 115, it copies the to-be-modified portion of the memory 115 to the storage device 117. In this manner, the state of the memory is preserved without interrupting the virtual machine's ability to perform operations to the memory 115. While the memory is being copied to the storage device 117, its progress can be tracked, such as by using a management file 131, as described in further detail below.

When a small portion of the memory remains to be copied to the storage device 117 (e.g., a last cluster), the VM 103 is paused at a reference point in time, and the snapshot manager 108 creates a new disk file 121 for each original disk file 119 at the reference point in time. The time it takes to copy the small portion of memory and create the new disk file 121 is the only downtime the VM 103 may experience to create the live snapshot 129. The snapshot manager 108 then resumes the VM 103 and begins copying data of the original disk file 119 to a disk snapshot file 125. The snapshot manager 108 can again invoke copy-on-write semantics such that subsequent disk operations are performed on the new disk file 121 and the original disk file 119 can be configured as a backing file for the new disk file 121. When the new disk file 121 does not have data the snapshot manager 108 needs to perform an operation, the snapshot manager 108 can reference the original disk file 119 for the data that is not present in the new disk file 121. Once all of the data of the original disk file 119 is copied to the disk snapshot file 125, the snapshot manager 108 creates the live snapshot using the disk snapshot file 125 and the copied memory. In one example, the disk snapshot file 125, in combination with the saved memory state, may be used to restore the VM 103 to a previous state.

In one implementation, the snapshot manager 108 uses a management file 131 to track and monitor the copying of data, such as memory or disk data. The management file 131 can include multiple entries that can be used to track segments, clusters or portions of data as part of a copy operation. For example, if a disk or memory is divided into 1064 clusters, the management file 131 can have 1064 entries—one for each cluster. The management file 131 can be used to track data as it is copied from the original disk file 119 to the disk snapshot file 125. Similarly, the management file 131 can also be used to track progress of a memory copy operation, a disk mirror or a disk clone operation. When using the management file 131, the snapshot manager 108 divides data into clusters and assigns an identifier to each cluster. The snapshot manager 108 can associate the identifier with an entry in the management file 131. The snapshot manager 108 can use the management file 131 to track which clusters have been copied to the disk snapshot file 125, for example, by marking each cluster as copied or not copied in the corresponding entry in the management file 131. When a cluster is copied to the disk snapshot file 125, the snapshot manager 108 marks the cluster entry in the management file 131 as 'copied.' Once all of the clusters are marked as 'copied,' the copy process is complete. In an example, the management file 131 can use a bitmap to track memory and storage data as it is copied to a file. For example, a '0' in the bitmap can indicate that the cluster has not been copied and a '1' can indicate that the cluster has been copied.

In one implementation, once all of the data of the original disk file 119 is copied to the disk snapshot file 125, the hypervisor 107 can merge the original disk file 119 and the new disk file 121 to form a merged file 123. The merged file 123 can be a mirror or a clone of the original disk file 119 and the new disk file 121. The merged file 123 can be in any format and can be in a different format than the original disk file 119 and the new disk file 121. In one implementation, the original disk file 119 and the merged file 123 are the same format (e.g., raw). The VM 103 can then use the merged file 123 for subsequent operations. When the snapshot manager 108 receives another request to create a live snapshot, the merged file 123 is used as the original disk file 119.

To create the merged file 123, the snapshot manager 108 can set the original disk file 119 as copy on write. When the VM 103 is to perform a read operation, it reads from the new disk file 121 and if the new disk file 121 has not been written, the VM 103 reads from the original disk file 119. For write operations, the VM 103 writes to both the new disk file 121 and the merged file 123. The snapshot manager 108 can monitor which data has been copied to the merged file 123, such as by using a background process and the management file 131. Any data that has not been copied can be copied from the original disk file 119 and the new disk file 121 to the merged file 123. Once the merged file 123 contains all of the data of the original disk file 119 and the new disk file 121, the snapshot manager 108 breaks the mirror or clone relationship between the original disk file 119, the new disk file 121 and the merged file 123. The snapshot manager 108 associates the merged file 123 with the VM 103 and uses the original disk file 119 for the live snapshot 129. The snapshot manager 108 can disassociate the new disk file 121 from the VM 103. The new disk file 121 can also be discarded.

In one implementation, the memory state can be saved to the original disk file 119. As the clusters of memory are copied to the original disk file 119, the memory copy process can be tracked using the management file 131 or using a statistics table within the original disk file 119 that functions in a similar manner as the management file 131. For example, when the original disk file is a qcow2 file, the memory, as well as a status of the copy process, can be stored within the original disk file 119. In another implementation, the memory state can be saved in a separate file, such as a migration file 127 that can be created by the snapshot manager 108. The memory copy process can be tracked using a statistics table within the same file, or using the management file 131. For example, the snapshot manager 108 can create a migration file 127 and can then copy the memory 115 to the migration file 127 while the snapshot manager 108 tracks the memory copy process using the management file 131.

In some implementations, multiple original disk files 119 are associated with the VM 103. The operations used to create a live snapshot 129 of a VM 103 that has multiple original disk files 119 can be similar to those described above. For example, once the memory copy process is complete, the snapshot manager 108 can create a new disk file 121 and a disk snapshot file 125 for each original disk file 119. Each original disk file 119 is set to copy on write and, as described above, when the VM 103 is to perform a read operation, it reads from the new disk file 121 and if the new disk file 121 has not been written, the VM 103 reads from the original disk file 119. Data from the original disk files 119 are copied to the respective disk snapshot files 125, as described above. Data can be copied to each disk snapshot file 125 simultaneously—the disk snapshot files 125 do not need to be populated in series with respect to each other. In another implementation, the snapshot manager 108 creates one new disk file as a wrapper 133 around all of the original disk files 119. Write operations are performed on the wrapper 133, which uses the original disk files 119 as backing files for data that is not yet in the wrapper 133. The wrapper 133 can be merged with the original disk files to create a merged file that the VM is to use for subsequent disk operations.

In some implementations, the snapshot manager 108 uses copy-on-write (qcow) format files, such as qcow or qcow2 files, for various operations. A qcow file is a type of disk image that uses optimization strategies to delay allocation of storage until it is actually needed. A qcow file grows as data is added, and supports advanced encryption system (AES) encryption, copy on write functionality, snapshots and/or transparent decompression. Qcow formatted disk files also support copy-on-write functionality. Each qcow file may include in a header a pointer to another qcow file that the qcow file relies upon. Accordingly, a qcow file can be used to store the changes intended for an original disk file to another disk file, without actually affecting the contents of the original disk file. The other disk file (e.g., a new disk file), looks like a standalone disk file to the user, but most of its data is obtained from the original disk file. Only the blocks of data that differ from the original disk file may be stored in the new disk file. The new disk file contains the path to the original disk file, and an image header gives the location of a path string within the file or object. When a hypervisor is to read from the new disk file, it may first check to see if a specific area being read is allocated within the new disk file. If not, then the hypervisor reads the area from the original disk file.

Figure 2:
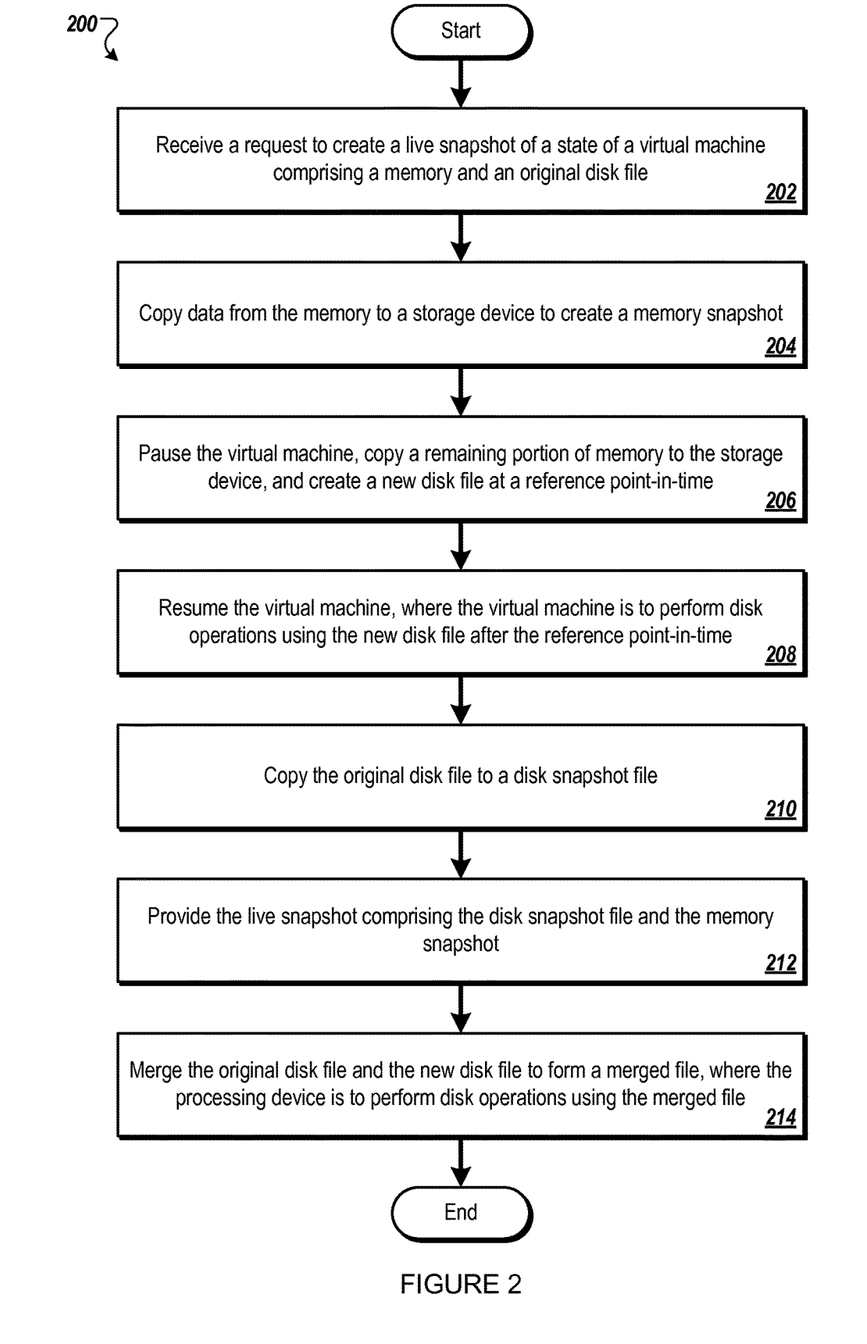
FIG. 2 is a flow diagram of a method for creating a live snapshot in accordance with some implementations.

FIG. 2 is a flow diagram of a method 200 for creating a live snapshot in accordance with some implementations. Method 200 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In one implementation, method 200 is performed primarily by hypervisor 107 of FIG. 1. For clarity of presentation, the description that follows uses the system 101 as examples for describing the method 200. However, another system, or combination of systems, may be used to perform the method 200.

Referring to FIG. 2, in one implementation, method 200 begins at block 202, with the hypervisor receiving a request to create a live snapshot of a state of a VM. The VM includes a memory and an original disk file that the VM can use to perform disk (e.g., I/O) operations. At block 204, the hypervisor copies data from the memory allocated to the VM to a storage device to create a memory snapshot. The hypervisor can copy the memory to the storage device in a piece-wise manner. When a small portion of memory remains to be copied to the storage device, then at block 206, the hypervisor pauses the VM, copies the remaining portion of memory to the storage device, and creates a new disk file at a reference point-in-time. At block 208, the hypervisor resumes the VM. From this point forward, disk operations can be handled using the new disk file, and the state of the data of the original disk file at the reference point in time can be preserved. When the new disk file does not have data needed to perform a disk operation, the hypervisor can reference the original disk file for the data that is not present in the new disk file.

At block 210, the hypervisor copies the original disk file to a disk snapshot file. The hypervisor can copy data of the original disk file to the disk snapshot file in segments or clusters, as described herein. Once the data of the original disk file is copied to the disk snapshot file, at block 212 the hypervisor provides the live snapshot of the VM state that includes the disk snapshot file and the memory snapshot. In one implementation, the hypervisor merges the original disk file and the new disk file to form a merged file at block 214 and the VM continues to perform disk operations using the merged file.

Figure 3:
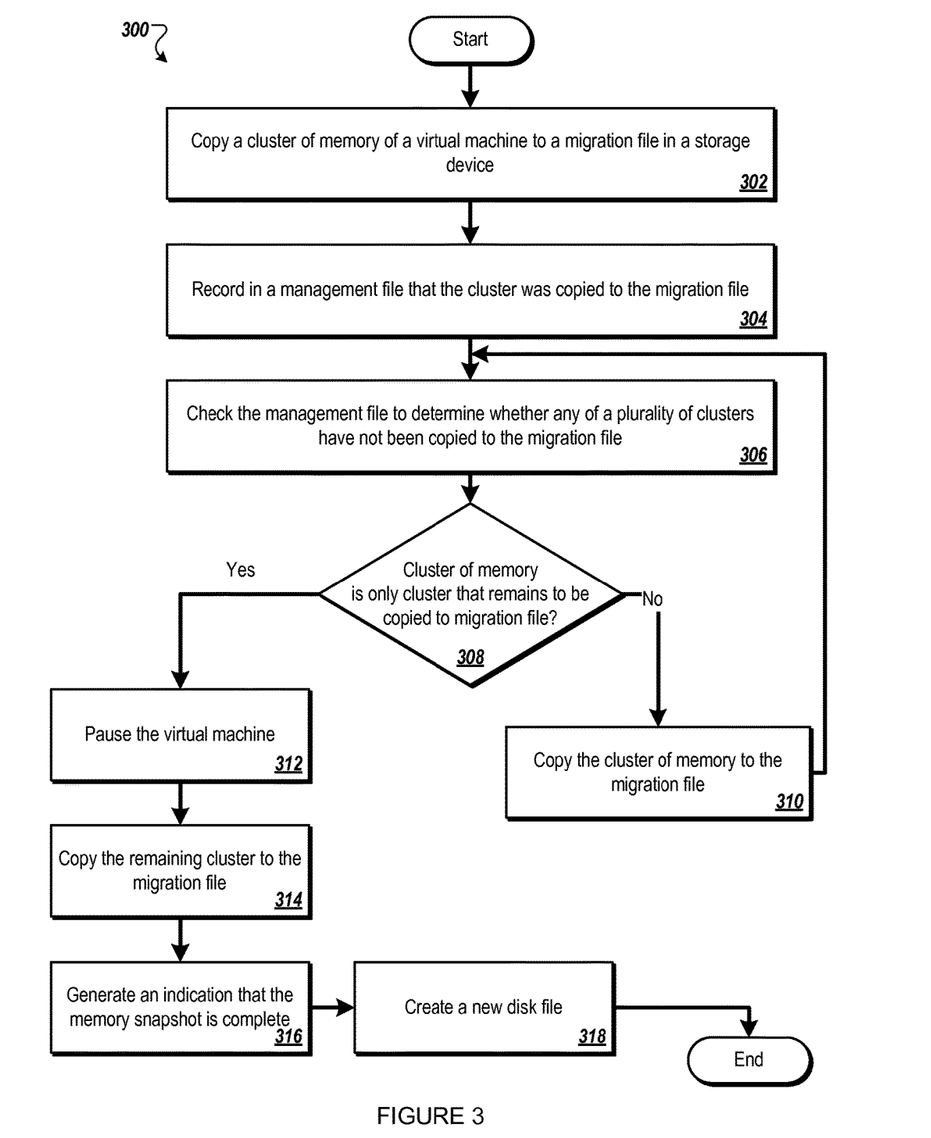
FIG. 3 is a flow diagram of a method for creating a memory portion of a live snapshot in accordance with some implementations.

FIG. 3 is a flow diagram of a method 300 for creating a memory snapshot of a live VM state snapshot in accordance with some implementations. Method 300 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In one implementation, method 300 is performed primarily by hypervisor 107 of FIG. 1. For clarity of presentation, the description that follows uses the system 101 as examples for describing the method 300. However, another system, or combination of systems, may be used to perform the method 300.

Referring to FIG. 3, in one implementation, method 300 begins at block 302, with the hypervisor copying a cluster of memory of a VM to a migration file in a storage device. At block 304, in one implementation, the hypervisor records in a management file that the cluster was copied to the migration file. At block 306, the hypervisor checks the management file to determine whether any of a plurality of clusters have not been copied to the migration file. The hypervisor can track the clusters, for example, using a bitmap as described herein. The hypervisor can scan the bitmap and identify whether a bit that corresponds to a cluster is set to 'copied' or 'not copied.' For example, the hypervisor can check the bitmap to see whether all of the bits except for one indicate that the plurality of clusters have been copied to memory. In some implementations, during the memory copy process, the hypervisor can identify a cluster of memory that has been modified (e.g., written to). The hypervisor can update the entry for that cluster in the bitmap to 'not copied.'

When the cluster of memory is not the only cluster that remains to be copied to the migration file (block 308), then the hypervisor copies the cluster of memory to the migration file at block 310 and proceeds to block 306 to check the management file to determine if any of the plurality of clusters have not been copied to the migration file.

When the cluster of memory is the only cluster that remains to be copied to the migration file (block 308), then the hypervisor pauses the VM at block 312. At block 314, the hypervisor copies the remaining cluster to the migration file. At block 316, the hypervisor optionally generates an indication that the memory snapshot is complete. At block 318, the hypervisor can create a new disk file, which can be created at the same time that the hypervisor copies the remaining cluster to the migration file.

Figure 4:
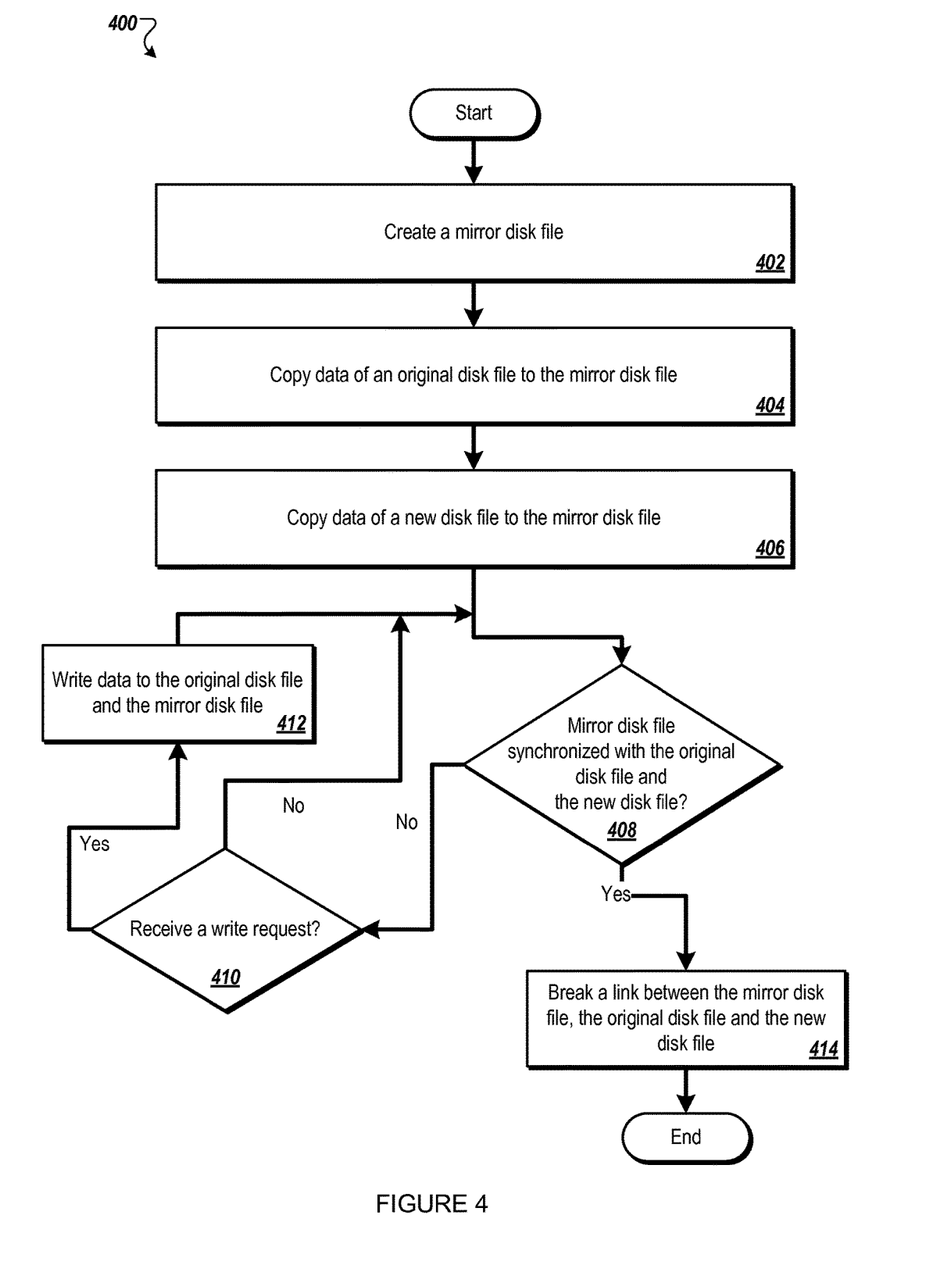
FIG. 4 is a flow diagram of a method for creating a mirror disk in accordance with some implementations.

FIG. 4 is a flow diagram of one implementation of a method 400 for creating a mirror disk file in accordance with some implementations. Method 400 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In one implementation, method 400 is performed primarily by hypervisor 107 of FIG. 1. For clarity of presentation, the description that follows uses the system 101 as examples for describing the method 400. However, another system, or combination of systems, may be used to perform the method 400.

Referring to FIG. 4, in one implementation, method 400 begins at block 402 where the hypervisor creates a mirror disk file. The mirror disk file is used to transition a VM from using an original disk file and a new disk file to using a single disk file, the mirror disk file. The mirror disk file can also be created in a different format than the original disk file or the single disk file, thus enabling a hypervisor to change the format of a disk file. At block 404, the hypervisor copies data of an original disk file to the mirror disk file and at block 406, the hypervisor copies data of a new disk file to the mirror disk file. Block 404 and 406 can be performed during the same time period. The mirror disk file can have a clone or mirror relationship with the original disk file and the new disk file. The new disk file can contain modifications to portions of data of the original disk file. When a data mismatch occurs between the data copied from the original disk file and the new disk file, the data from the new disk file trumps data from the original disk file. In this implementation, the completed mirror disk file contains data from the original disk file and all modifications to that data as copied from the new disk file.

In one implementation, the original disk file is copied to the mirror disk file first. Then, once the original disk file is fully copied to the mirror disk file, the new disk file is copied to the mirror disk file. Since the new disk file contains only changes to the original disk file, once the new disk file is copied to the mirror disk file, the mirror disk file represents the current storage state of the VM.

In another implementation, both the original disk file and the new disk file are copied to the mirror disk file during the same time period. The hypervisor can refrain from copying clusters of the original disk file that are present in the new disk file. A management file can be used to track these clusters. For example, a bitmap can be generated for the original disk file to have 1064 entries that correspond to 1064 disk clusters. Both the original disk file and the new disk file have 1064 clusters that correspond with each other. The bitmap can indicate which clusters are in the new disk file and the hypervisor can refrain from copying these clusters from the original disk file to the mirror disk file.

While the mirror disk file is not synchronized with the original disk file and the new disk file (block 408) and if the hypervisor does not receive a write request at block 410, it continues to copy the data of the original disk file and the new disk file to the mirror disk file at blocks 404 and 406. To check for synchronization, the hypervisor can again use the management file. As in the example above, the management file can have 1064 entries in a bitmap that correspond to clusters of the original disk file and the new disk file. When a cluster is copied to the mirror disk file, the corresponding mirror disk file bitmap can be populated to indicate that the cluster has been copied to the mirror disk file. When all 1064 entries of the mirror disk file bitmap are populated to indicate that data has been copied to all 1064 clusters of the mirror disk file, and when the entries populated in the new disk file bitmap match the corresponding entries in the mirror disk file bitmap, then the synchronization is complete.

When the hypervisor receives a write request at block 410, the hypervisor writes the data to the original disk file and to the mirror disk file at block 412 to ensure both disk files have the current data.

When the mirror disk file is synchronized with the original disk file and the new disk file (block 408), then the mirror disk file is a clone of the original disk file and the new disk file.

At block 414, the hypervisor breaks a link to the mirror disk file, the original disk file and the new disk file. For example, the hypervisor breaks a mirror or clone relationship between the mirror disk file, the original disk file and the new disk file. The hypervisor can instruct the VM to use the mirror disk file for subsequent disk operations. In this manner, the hypervisor transitions the VM from using two disk files to a single disk file.

For VM implementations that use multiple original disk files and multiple new disk files, a mirror disk is created for each original disk file and the process described above in conjunction with FIG. 4 is performed to create a mirror file for each original disk file by combining the original disk file and the new disk file.

Figure 5:
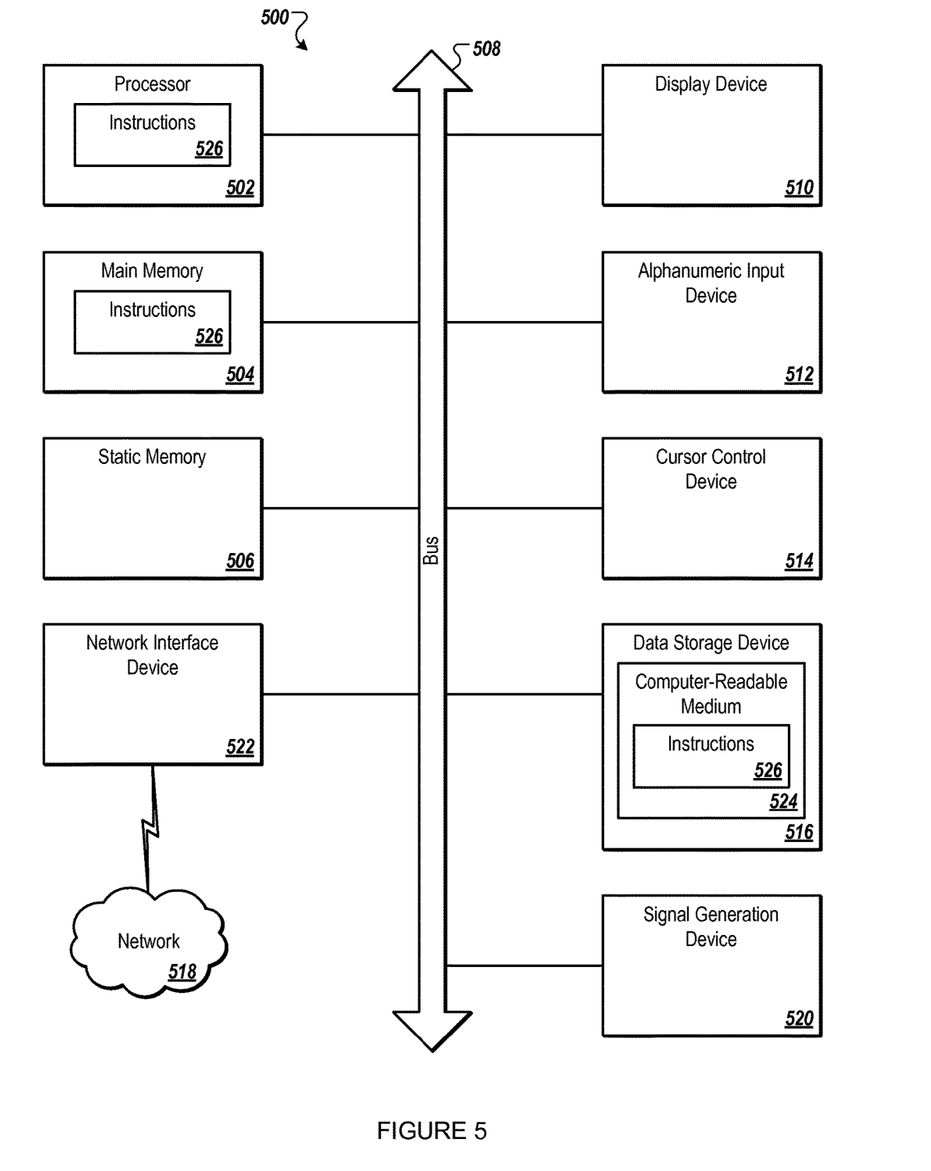
FIG. 5 is a schematic diagram that shows an example of a machine in the form of a computer system.

FIG. 5 is a schematic diagram that shows an example of a machine in the form of a computer system 500. The computer system 500 executes one or more sets of instructions 526 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 526 to perform any one or more of the methodologies discussed herein.

The computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions of the host computer system 101 for performing the operations and steps discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored the sets of instructions 526 of the host computer system 101 embodying any one or more of the methodologies or functions described herein. The sets of instructions 526 of the host computer system 101 may also reside, completely or at least partially, within the main memory 504 and/or within the processor 502 during execution thereof by the computer system 500, the main memory 504 and the processor 502 also constituting computer-readable storage media. The sets of instructions 526 may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions 526. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting", "transmitting", "receiving", "preventing", "associating", "creating", "permitting", "holding", "dissociating", "exposing", initiating", "identifying", "copying," "resuming," "pausing," "recording," "checking," "writing," "receiving," "updating," "suspending," "generating," "breaking," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

receiving a request to create a live snapshot of a state of a virtual machine having a memory and an original disk file;

copying, by a processor executing a hypervisor, data from the memory to a storage device to form a memory snapshot;

pausing the virtual machine and creating a new disk file at a reference point-in-time, wherein the original disk file is a backing file of the new disk file;

resuming the virtual machine, wherein the virtual machine is to perform disk operations using the new disk file after the reference point-in-time;

accessing the original disk file when the new disk file does not have data needed to perform the disk operations after the reference point in time;

copying the original disk file to a disk snapshot file;

monitoring progress of a copy operation of data copied from the original disk file to the disk snapshot file using an indicator for the disk snapshot file;

providing the live snapshot comprising the disk snapshot file and the memory snapshot; and in response to the original disk file being copied to the disk snapshot file, merging the original disk file and the new disk file to form a merged file, wherein the virtual machine is to continue to perform disk operations using the merged file, wherein the merging comprises:

creating a mirror disk file;

copying data of the original disk file to the mirror disk file;

copying data of the new disk file to the mirror disk file;

in response to receiving a write request before the mirror file is synchronized with the original disk file and the new disk file, writing data to both the new disk file and the mirror file, wherein determining whether the mirror file is synchronized with the original disk file and the new disk file comprises determining whether entries of a bitmap for the mirror disk file match corresponding entries of a bitmap for the new disk file; and in response to the mirror disk file being synchronized with the original disk file and the new disk file, breaking a link to the original disk file and the new disk file.

2. The method of claim 1, wherein the memory comprises a plurality of clusters of data, wherein copying data from the memory to the storage device comprises:

copying one of the plurality of clusters to the storage device; and recording in a storage that the cluster was copied to the storage device.

3. The method of claim 2, wherein copying data from the memory to the storage device further comprises:

checking the storage device to determine whether any of the plurality of clusters have not been copied to the storage device; and in response to one of the plurality of clusters not being copied to the storage device, copying that cluster to the storage device.

4. The method of claim 2 further comprising:

identifying a cluster of memory that has been modified;

updating the storage to indicate that the modified cluster has not been copied to the storage device, and wherein copying data from the memory to the storage device further comprises:

copying the modified cluster to the storage device; and updating the storage to indicate that the modified cluster has been copied to the storage device.

5. The method of claim 2, wherein copying data from the memory to the storage device further comprises identifying a last cluster in the plurality of clusters that has not been copied to the storage device, and wherein pausing the virtual machine comprises:

suspending the virtual machine; and copying the last cluster to the storage device.

6. The method of claim 2 further comprising:

in response to each of the plurality of clusters being copied to the storage device, generating an indication that the memory snapshot is complete.

7. The method of claim 1, wherein the new disk file is a Quick EMUlator (QEMU) copy-on-write (qcow2) file and the original disk file and the mirror file have a same type of format.

8. The method of claim 7, wherein the original disk file and the new disk file are raw image files.

9. The method of claim 1, wherein the virtual machine comprises a plurality of original disk files, wherein creating a new disk file comprises creating a wrapper file around the plurality of original disk files, wherein the merged file is created by merging the plurality of original disk files and the wrapper file.

10. The method of claim 9, wherein the merged file is a disk image file.

11. A system comprising:

a host memory;

a storage device;

a processor operatively coupled to the host memory and to the storage device, the processor to:

receive a request to create a live snapshot of a state of a virtual machine having a virtual machine memory and an original disk file;

copy data from the virtual machine memory to the storage device to form a memory snapshot;

pause the virtual machine and create a new disk file at a reference point-in-ti me, wherein the original disk file is a backing file of the new disk file;

resume the virtual machine, wherein the virtual machine is to perform disk operations using the new disk file after the reference point-in-time;

access the original disk file when the new disk file does not have data needed to perform the disk operations after the reference point in time;

copy the original disk file to a disk snapshot file in the storage device;

monitor progress of a copy operation of data copied from the original disk file to the disk snapshot file using an indicator for the disk snapshot file;

provide the live snapshot comprising the disk snapshot file and the memory snapshot; and in response to the original disk file being copied to the disk snapshot file, merge the original disk file and the new disk file to form a merged file, wherein the virtual machine is to continue to perform disk operations using the merged file, wherein to merge the processor is to:

create a mirror disk file;

copy data of the original disk file to the mirror disk file;

copy data of the new disk file to the mirror disk file;

in response to receiving a write request before the mirror file is synchronized with the original disk file and the new disk file, write data to both the new disk file and the mirror file, wherein determining whether the mirror file is synchronized with the original disk file and the new disk file comprises determining whether entries of a bitmap for the mirror disk file match corresponding entries of a bitmap for the new disk file; and in response to the mirror disk file being synchronized with the original disk file and the new disk file, breaking a link to the original disk file and the new disk file.

12. The system of claim 11, wherein the virtual machine memory comprises a plurality of clusters of data, wherein in response to the processor copying data from the virtual machine memory to the storage device, the processor is further to:

copy one of the plurality of clusters to the storage device; and record in a management file that the cluster was copied to the storage device.

13. The system of claim 12, wherein in response to the processor identifying a cluster of memory that has been modified, the processor is to update the management file to indicate that the modified cluster has not been copied to the storage device, and wherein in response to the processor copying data from the memory to the storage device, the processor is further to:

copy the written cluster to the storage device; and update the management file to indicate that the modified cluster has been copied to the storage device.

14. A non-transitory computer-readable storage medium comprising instructions that, when executed by a processor, cause the processor to:

receive a request to create a live snapshot of a state of a virtual machine having a memory and an original disk file;

copy, by the processor, data from the memory to a storage device to form a memory snapshot;

pause the virtual machine and create a new disk file at a reference point-in-time, wherein the original disk file is a backing file of the new disk file;

resume the virtual machine, wherein the virtual machine is to perform disk operations using the new disk file after the reference point-in-time;

access the original disk file when the new disk file does not have data needed to perform the disk operations after the reference point in time;

copy the original disk file to a disk snapshot file;

monitor progress of a copy operation of data copied from the original disk file to the disk snapshot file using an indicator for the disk snapshot file;

provide the live snapshot comprising the disk snapshot file and the memory snapshot; and in response to the original disk file being copied to the disk snapshot file, merge the original disk file and the new disk file to form a merged file, wherein the virtual machine is to continue to perform disk operations using the merged file, wherein to merge the processor is to:
create a mirror disk file;
copy data of the original disk file to the mirror disk file;
copy data of the new disk file to the mirror disk file;
in response to receiving a write request before the mirror file is synchronized with the original disk file and the new disk file, write data to both the new disk file and the mirror file, wherein determining whether the mirror file is synchronized with the original disk file and the new disk file comprises determining whether entries of a bitmap for the mirror disk file match corresponding entries of a bitmap for the new disk file; and in response to the mirror disk file being synchronized with the original disk file and the new disk file, breaking a link to the original disk file and the new disk file.

15. The non-transitory computer-readable storage medium of claim 14, wherein to copy data from the memory to the storage device further comprises to identify a last cluster in a plurality of clusters that has not been copied to the storage device, and wherein to pause the virtual machine comprises:
suspend the virtual machine; and
copy the last cluster to the storage device.

16. The non-transitory computer-readable storage medium of claim 14 further comprising in response to each of a plurality of clusters being copied to the storage device, generate an indication that the memory snapshot is complete.

17. The method of claim 1, further comprising:
in response to a data mismatch between the data of the original disk file copied to the mirror disk file and the data of the new disk file copied to the mirror disk file, selecting the data of the new disk file over the data of the original disk file.

18. The system of claim 11, the processor further to:
in response to a data mismatch between the data of the original disk file copied to the mirror disk file and the data of the new disk file copied to the mirror disk file, select the data of the new disk file over the data of the original disk file.

19. The non-transitory computer-readable storage medium of claim 14 comprising further instructions that, when executed by the processor, cause the processor to:
in response to a data mismatch between the data of the original disk file copied to the mirror disk file and the data of the new disk file copied to the mirror disk file, select the data of the new disk file over the data of the original disk file.

* * * * *